Patented Sept. 16, 1941

2,256,148

UNITED STATES PATENT OFFICE 2,256,148

METHOD OF PREPARING COPOLYMERS

Joy G. Lichty, Stow, Ohio, assignor to Wingfoot Corporation, Wilmington, Del., a corporation of Delaware No Drawing. Application March 31, 1938, Serial No. 199,185

13 Claims. (Cl. 260—84)

This invention relates to an improved method of copolymerizing a plurality of substances by means of a catalyst or modifier and to useful products obtained thereby. More particularly, it relates to the use of special catalysts or modifiers which improve the yield and the properties of the resulting polymerized mass.

Various useful polymerized materials have been prepared by the co-polymerization of different unsaturated compounds, such as butadiene and acrylo nitrile or butadiene and styrene. These co-polymers are intended as substitutes for rubber and have various rubber-like properties. It has now been found that the yield of useful material from these co-polymerizations can be greatly increased and the properties thereof improved for certain purposes if there be added to the mixture of monomers, as the materials to be polymerized are called, a small proportion of a chloropropionitrile which may be prepared by the interaction of acrylo nitrile and chlorine or by other appropriate procedures. These chloropropionitriles appear to act as catalysts or promoters of the polymerization and may also co-polymerize with the monomers upon losing part of their chlorine content.

The catalysts or promoters are the mono chloro propio nitriles, the dichloro propio nitriles, and trichloro propio nitriles, the trichloro compounds being preferred. These compounds may be prepared by passing chlorine gas into acrylo nitrile in accordance with the following equation, which applies to the preparation of trichloro propio nitrile: $CH_2=CH-CN+2Cl_2 \rightarrow CH_2Cl-CCl_2-CN+HCl$. Thus, a 159 gram portion (3 mols) of acrylo nitrile was maintained at a temperature of 20–25° C. in a main during the addition of 117 grams (1.65 mols) of chlorine. The product was then distilled through a one foot fractionating column. After two distillations, fractions were obtained as follows:

|   | Grams |
|---|---|
| 1. B. P. 79–80°/63 mm | 12.2 |
| 2. B. P. 80–81°/63 mm | 103.6 |
| 3. B. P. 81–98°/63–61 mm | 13.9 |
| 4. B. P. 98°/61 mm | 35.5 |

Fraction 2 is the product referred to as trichloro propio nitrile which was identified by the following data:
Boiling point—80–81° C./63 mm.
Density at 24° C. _____ 1.42
Index of refraction at 24° C. _____ 1.4379
Analysis:
  Percent chlorine found 65.85, 65.82, 66.02.
  Percent chlorine calculated for $C_3H_2NCl_3$— 67.3.

Mono chloro propionitrile, or mono chloro acrylo nitrile, was obtained from fraction 4.

Three chloro propionitriles used for the purposes of the present invention and obtained in the foregoing manner or in a similar manner are, then, alpha chloro propionitrile boiling at 121–2° C. with decomposition, alpha, alpha dichloro propionitrile boiling at 105° C. and alpha, alpha, beta trichloro propionitrile boiling at 80–81° C./63 mm. The trichloro propionitriles have not previously been known and are believed to be new compounds. The alpha, alpha beta trichloro propionitrile has so far proved to be the best catalyst for promoting the interpolymerization of monomeric substances, such as those described below, and is preferred for such purpose. However, the invention includes the chloropropionitriles as a class and is not limited to the species just described.

The promoter may be used to aid the polymerization of various mixtures of polymerizable substances, these being of unsaturated nature and having the faculty of interpolymerizing with each other to yield compounds of rubber-like or resinous nature. Thus, for example, it is found that the catalyst aids polymerization of mixtures of any two monomers selected from the following groups, the two monomers being selected from different groups. These groups may be termed the butadienes; the esters and nitriles of acrylic acids; and vinyl compounds substituted by a cyclic radical, such as the aromatic, alicyclic or heterocyclic rings, in which a conjugated system of double bonds is present, i. e., those having double bonds paired in 1:3 relationship. Examples illustrating each group but to which such group is not limited are these:

GROUP I

Butadiene, methyl butadiene or isoprene, dimethyl butadiene, chloro butadiene.

GROUP II

Acrylo nitrile, methacrylo nitrile, esters of acrylic acid, such as methyl acrylate, ethyl acrylate, butyl acrylate, isobutyl acrylate, and esters of substituted acrylic acids, such as those of methacrylic acids, alpha ethylacrylic acids, alpha propylacrylic acids, etc. Some of these are methyl methacrylate, ethyl methacrylate, allyl methacrylate, vinyl methacrylate, octyl methacrylate, etc.

GROUP III

Vinyl benzene (styrene), vinyl naphthalene, vinyl furane, and other conjugated vinyl compounds of this class.

The compounds of this last group may also be considered as derivatives of ethylene in which one carbon atom carries ring substituents which afford a conjugated system of double bonds, the other carbon atom being unsubstituted so as to leave a free terminal methylene group which appears to be necessary or desirable for co-polymerization with other unsaturated compounds. Thus, vinyl naphthalene,

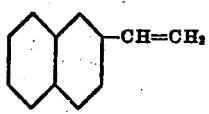

may be thought of as ethylene in which a naphthyl ring has been substituted. Mixtures of two monomers, the co-polymerization of which may be promoted by the use of a chloro propionitrile are the following butadiene+acrylo nitrile, butadiene+meth acrylo nitrile, butadiene+the methyl ester of methacrylic acid, styrene+acrylo nitrile, methyl butadiene+styrene, and similar mixtures.

It will be noted that all of the compounds included in the three groups set forth above are characterized by the presence of at least one ethylenic linkage, by which is meant doubly bonded carbon, the carbon atoms carrying substituents which may be any of the various radicals.

The foregoing examples are illustrative only and it will be understood that the present invention concerns a catalyst or promoter or modifier for this type of polymerization, the improved method being applicable to co-polymerizations in general of two or more unsaturated compounds and regardless of the identity of the constituents of the polymerizable mixture, provided that polymerization takes place essentially by moderate heating for a period of time necessary to complete reaction. Also, the monomers may be present in various proportions, the range from 25% to 75% of the total monomer for each constituent embracing the most useful proportions. The catalyst may be present to the extent of 3 to 6% based on the total monomer treated, but these proportions may be varied up or down as conditions require. Various emulsifiers, such as soaps and the like, and oxidizing agents, such as sodium perborate, may also be present in the emulsion in which the monomers are ordinarily polymerized.

As mentioned, the chloro propionitrile increases yields and it also produces a softer rubber-like polymer than is obtainable without its presence. This is illustrated by the following examples.

*Example 1*

A mixture was made up of the following ingredients:

| | Parts |
|---|---|
| 3% solution of Aquarex D (a Na sulphate ester of higher alcohols) | 20 |
| Butadiene | 12 |
| Acrylonitrile | 4 |
| Chloro compound as stated. | |
| Sodium perborate as stated. | |

The polymerization was conducted at room temperature in glass tubes, the catalyst used being either trichloro propionitrile, or carbon tetra chloride for comparison. The oxidizing agent, sodium perborate, was varied in amount.

| Halide | Parts | Parts NaBO₃ | Days | Percent yield |
|---|---|---|---|---|
| C₃H₂Cl₃N | 0.48 | 0.123 | 5¾ | 90 |
| Do | 0.48 | 0.266 | 5¾ | 80.4 |
| Do | 0.96 | 0.133 | 5¾ | 86.3 |
| CCl₄ | 0.48 | 0.133 | 5¾ | 65.0 |
| Do | 0.48 | 0.266 | 5¾ | 64.7 |

It will be noted that the trichloro propionitrile gave much better yields, up to 90%, than did the carbon tetra chloride, the increase amounting to some 30 or 40%.

The chloro propionitrile also aids co-polymerization at higher than room temperatures, the reaction sometimes being conducted at temperatures up to 70° or 80° C. While it has been pointed out that the new catalyst or promoter greatly increases yields, it may be used to lessen the time of polymerization, which is long, and it also produces a synthetic rubber which is soft and elastic. Such products are often desirable for uses where a tougher resilient rubber could not be used.

While there has been described above the preferred embodiment of the invention, it will be apparent that the same is of general utility and the catalyst may be used to promote various co-polymerizations of different monomers wherever this polymerization is achieved mainly by heating in an emulsion or otherwise. It will be apparent, then, to those skilled in the art that various modifications may be made without departing from the spirit of the invention or the scope of the appended claims in which it is intended to cover all features of patentable novelty residing in the invention.

What I claim is:

1. A method of preparing copolymers which comprises heating a mixture of a butadiene and an acrylonitrile in the presence of trichloropropionitrile.

2. A method of preparing copolymers which comprises polymerizing a mixture of at least two monomers each containing an ethylenic linkage and at least one containing conjugated double bonds in the presence of a chloropropionitrile.

3. A method of preparing copolymers from a butadiene and another monomer containing an ethylenic linkage which comprises heating a mixture of the two monomers in the presence of a chloropropionitrile having at least one and not more than three chlorine atoms in the molecule.

4. A method of preparing copolymers which comprises polymerizing a mixture of two monomers each of which contains an ethylenic linkage and only one of which is a butadiene, in the presence of trichloropropionitrile.

5. A method of preparing copolymers which comprises polymerizing a mixture of monomers each of which contains an ethylenic linkage and at least one of which contains conjugated double bonds in the presence of about 3 to 6% on the total weight of monomers treated of a chloropropionitrile.

6. A method of preparing copolymers which comprises heating a mixture of two monomers each of which contains an ethylenic linkage and at least one of which contains conjugated double bonds in the presence of alpha, alpha, beta trichloropropionitrile.

7. A method of preparing copolymers which comprises polymerizing a mixture of two monomers each of which contains an ethylenic linkage and at least one of which contains conjugated double bonds in the presence of alpha, alpha dichloropropionitrile.

8. A method of preparing copolymers which comprises polymerizing a mixture of polymerizable monomers each of which contains an ethylenic linkage and at least one of which contains conjugated double bonds in the presence of alpha chloropropionitrile.

9. A method of preparing copolymers which comprises polymerizing a mixture of two monomers each of which contains an ethylenic linkage and at least one of which contains conjugated double bonds in which each constituent represents at least 25% of the total monomers treated in the presence of a chloropropionitrile.

10. A method of preparing copolymers which comprises polymerizing a mixture of monomers each of which contains an ethylenic linkage and at least one of which contains conjugated double bonds in the presence of sodium perborate, an emulsifying agent, and trichloropropionitrile.

11. In a method of preparing copolymers by polymerizing a mixture of unsaturated monomers each of which contains an ethylenic linkage and at least one of which contains conjugated double bonds, in the presence of a catalytic oxidizing agent and an emulsifying agent, the improvement which comprises conducting the polymerization in the presence of a chloropropionitrile.

12. A method of preparing copolymers which comprises heating a mixture of a butadiene and an ester of an acrylic acid in the presence of trichloropropionitrile.

13. A method of preparing copolymers which comprises heating a mixture of a butadiene and styrene in the presence of dichloropropionitrile.

JOY G. LICHTY.